US012807003B2

(12) United States Patent
Inoue

(10) Patent No.: US 12,807,003 B2
(45) Date of Patent: Nov. 24, 2026

(54) DETERMINING ABNORMALITIES IN A POWER SUPPLY SYSTEM

(71) Applicant: TOYOTA JIDOSHA KABUSHIKI KAISHA, Toyota (JP)

(72) Inventor: Shinichi Inoue, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 19/003,189

(22) Filed: Dec. 27, 2024

(65) Prior Publication Data

US 2025/0289313 A1 Sep. 18, 2025

(30) Foreign Application Priority Data

Mar. 14, 2024 (JP) ................................ 2024-039908

(51) Int. Cl.
*B60L 3/00* (2019.01)

(52) U.S. Cl.
CPC ......... *B60L 3/0046* (2013.01); *B60L 2210/10* (2013.01); *B60L 2250/16* (2013.01)

(58) Field of Classification Search
None
See application file for complete search history.

(56) References Cited

U.S. PATENT DOCUMENTS

2012/0158245 A1* 6/2012 Yoshizawa .......... H02M 3/1582 340/455
2015/0233993 A1* 8/2015 Lee ........................ G01R 31/40 324/503
2023/0155372 A1* 5/2023 Shiraishi .................. H02H 7/18 307/9.1
2024/0308353 A1* 9/2024 Takase .................... B60L 3/003

FOREIGN PATENT DOCUMENTS

JP 2000224709 A * 8/2000
JP 2024-131345 A 9/2024

* cited by examiner

*Primary Examiner* — Shayne M. Gilbertson
(74) *Attorney, Agent, or Firm* — SoraIP, Inc.

(57) ABSTRACT

In a power supply system mounted on a hybrid electric vehicle, a DC/DC converter converts an output voltage of a driving battery and supplies the converted voltage to an auxiliary load. The alternator is driven by an engine to generate electric power, and supplies the generated electric power to an auxiliary load. The output unit outputs an alert regarding DC/DC converter and the alternator to the occupant. The output unit outputs a first warning prompting a stop when both DC/DC converter and the alternator are abnormal, and outputs a second warning that differs from the first warning when either DC/DC converter or the alternator is abnormal.

4 Claims, 2 Drawing Sheets

DETERMINING ABNORMALITIES IN A POWER SUPPLY SYSTEM

CROSS-REFERENCE TO RELATED APPLICATION

This application claims priority to Japanese Patent Application No. 2024-039908 filed on Mar. 14, 2024, incorporated herein by reference in its entirety.

BACKGROUND

1. Technical Field

The present disclosure relates to a power supply system mounted on a hybrid electric vehicle.

2. Description of Related Art

In recent years, as electric power consumed by an auxiliary load has increased in a hybrid electric vehicle, electric power supply may be insufficient simply by supplying electric power from a driving battery to the auxiliary load via a direct-current (DC)/DC converter. Thus, the shortage of electric power can be resolved by adding an alternator and also supplying electric power generated by the alternator to the auxiliary load. Japanese Patent Application No. 2023-041551 discloses a vehicle power supply system comprising a high-voltage battery, a DC/DC converter that supplies electric power to an auxiliary load, and an engine-driven alternator connected in parallel with the DC/DC converter.

SUMMARY

In the above-described power supply system, it is desired to appropriately notify an occupant when an abnormality is caused in at least one of the DC/DC converter and the alternator.

It is an object of the present disclosure to provide a technique capable of appropriately outputting a warning about a DC/DC converter and an alternator in a hybrid electric vehicle.

In order to address the above issue, an aspect of the present disclosure provides

- a power supply system mounted on a hybrid electric vehicle. The power supply system includes:
- a direct-current (DC)/DC converter that converts an output voltage of a driving battery of the hybrid electric vehicle and supplies the converted voltage to an auxiliary load;
- an alternator that is driven by an engine of the hybrid electric vehicle to generate electric power and supplies the generated electric power to the auxiliary load; and
- an output unit that outputs a warning about the DC/DC converter and the alternator to an occupant of the hybrid electric vehicle.

The output unit is configured to:

- output a first warning that prompts stopping the vehicle when both the DC/DC converter and the alternator are abnormal; and
- output a second warning that is different from the first warning when one of the DC/DC converter and the alternator is abnormal.

According to the present disclosure, it is possible to provide a technique capable of appropriately outputting a warning about a DC/DC converter and an alternator in a hybrid electric vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
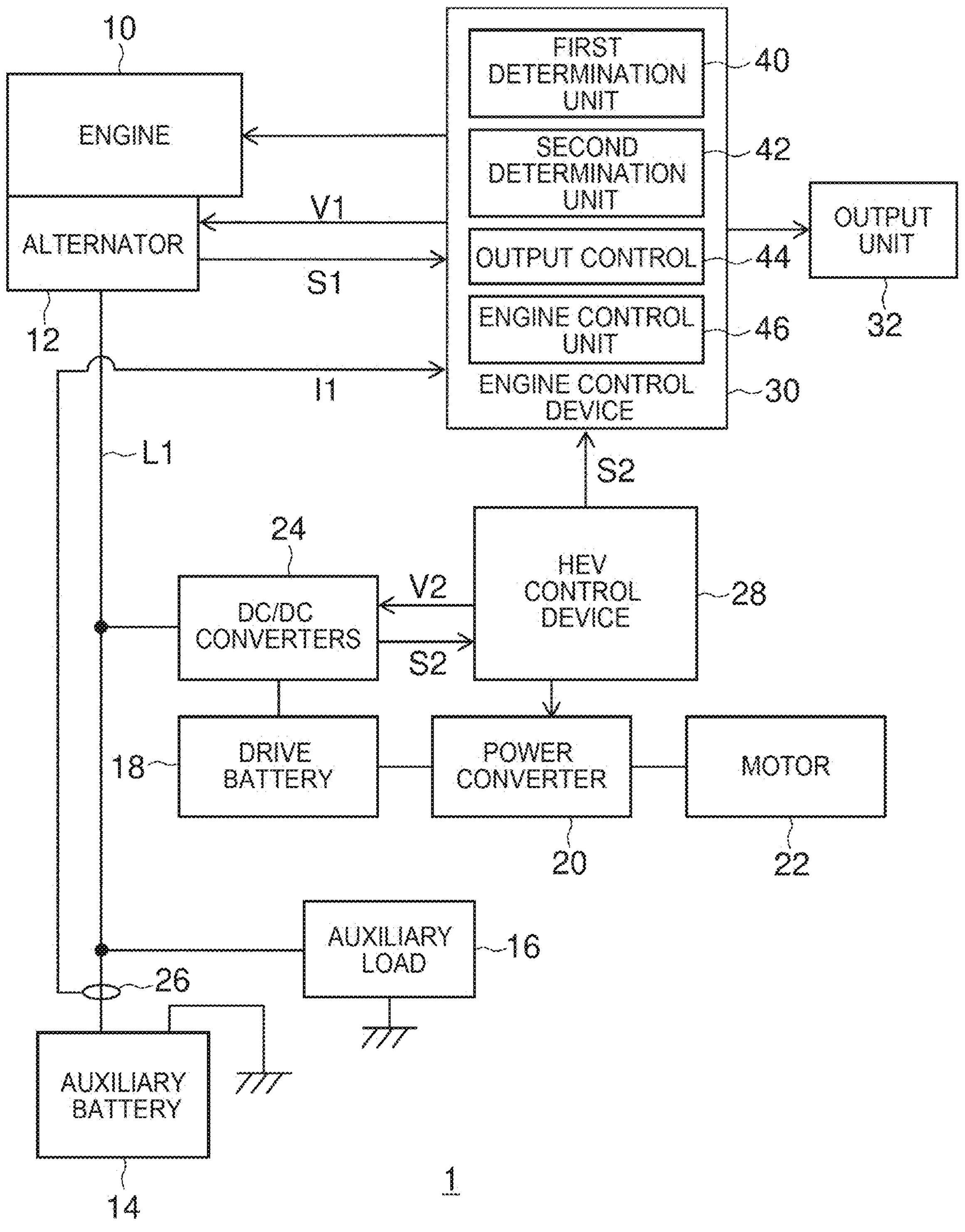
FIG. 1 is a diagram schematically illustrating a functional configuration of a power supply system according to an embodiment.

FIG. 1 schematically illustrates a functional configuration of a power supply system 1 according to an embodiment. The power supply system 1 is mounted on a hybrid electric vehicle (HEV) (not shown). Hereinafter, hybrid electric vehicle will be simply referred to as vehicles. The power supply system 1 may be mounted on a plug-in hybrid electric vehicle (PHEV).

The power supply system 1 includes an engine 10, an alternator 12, an auxiliary battery 14, an auxiliary load 16, a driving battery 18, a power converter 20, a motor 22, a DC/DC converter 24, a current sensor 26, an HEV control device 28, an engine control device 30, and an output unit 32. The alternator 12, the auxiliary battery 14, the driving battery 18, and DC/DC converter 24 may also be referred to as auxiliary power supplies. The driving battery 18, the power converter 20, the motor 22, DC/DC converter 24, and HEV control device 28 may also be referred to as HEV.

The vehicle travels by driving force from at least one of the engine 10 and the motor 22.

The engine 10 is an internal combustion engine, and is started and stopped under the control of the engine control device 30. The driving force of the engine 10 is transmitted to the alternator 12. The driving force of the engine 10 may also be transmitted to drive wheels (not shown).

The alternator 12 is driven by the engine 10 to generate electric power, and supplies the DC power obtained by the electric power generation to the auxiliary battery 14 and the auxiliary load 16 via the power supply line L1. The alternator 12 controls the output voltage so as to approach the voltage indicated by the first power generation voltage instruction V1 from the engine control device 30.

The alternator 12 outputs the first power generation status information S1 to the engine control device 30. The first power generation status information S1 is information about the operating state of the alternator 12. The information regarding the operating state of the alternator 12 is information for determining whether the alternator 12 is normal or abnormal. For example, the information about the operating state of the alternator 12 includes information about the number of rotations of the rotor of the alternator 12, the internal voltage of the alternator 12, or the output current of the alternator 12. The internal voltage is a voltage that may be different from the output voltage of the output terminal of the alternator 12 connected to the power supply line L1, and is a voltage that can detect a fault such as a ground fault of the alternator 12.

The auxiliary battery 14 is a rechargeable secondary battery. The auxiliary battery 14 is a battery having a voltage lower than that of the driving battery 18. The auxiliary battery 14 is capable of supplying power to the auxiliary load 16. The auxiliary battery 14 may be charged by at least one of the generated electric power of the alternator 12 and the electric power of the driving battery 18 supplied through DC/DC converter 24.

The auxiliary load 16 is a load of an electronic device or the like provided in the vehicle. The auxiliary load 16 may include, for example, headlamps, navigational devices, audio devices, advanced driving assistance systems, various ECU, and the like. The auxiliary load 16 may include an HEV control device 28, an engine control device 30, and an output unit 32. The auxiliary load 16 is operable using at least one of the generated power of the alternator 12, the power of the driving battery 18, and the power of the auxiliary battery 14.

The driving battery 18 is, for example, a rechargeable secondary battery such as a lithium ion battery. The driving battery 18 is capable of supplying power to the power converter 20 and DC/DC converter 24.

The power converter 20 includes an inverter and the like, converts the electric power of the driving battery 18, and supplies the converted electric power to the motor 22. The motor 22 generates a driving force by using the output power of the power converter 20. The driving force of the motor 22 is transmitted to the driving wheels.

Input-terminals of DC/DC converter 24 are connected to the driving battery 18. The output terminals of DC/DC converter 24 are connected to the alternator 12, the auxiliary battery 14, and the auxiliary load 16 via the power supply line L1. DC/DC converter 24 is capable of supplying the power of the driving battery 18 to the auxiliary battery 14 and the auxiliary load 16. DC/DC converter 24 steps down the output voltage of the driving battery 18 so as to approach the voltage indicated by the second power generation voltage instruction V2 from HEV control device 28, and outputs the stepped-down voltage to the auxiliary load 16 and the like. The second power generation voltage instruction V2 may also be referred to as a voltage command.

DC/DC converter 24 outputs the second power generation status information S2 to HEV control device 28. HEV control device 28 supplies the received second power generation status information S2 to the engine control device 30. The second power generation status information S2 is information related to the operation state of DC/DC converter 24. The information on the operating status of DC/DC converter 24 is information for determining whether DC/DC converter 24 is normal or abnormal, and includes, for example, information on an inner voltage or an output current of DC/DC converter 24. The internal voltage is a voltage that may be different from the output voltage of the output terminal of DC/DC converter 24 connected to the power supply line L1, and is a voltage that can detect a fault such as a ground fault of DC/DC converter 24.

The current sensor 26 detects an output current I1 of the auxiliary battery 14 and supplies the detected output current I1 to the engine control device 30. The output current I1 of the auxiliary battery 14 is a current flowing from the auxiliary battery 14 to the auxiliary load 16.

HEV control device 28 switches the traveling mode of the vehicle to the first traveling mode or the second traveling mode on the basis of various types of signals supplied from various in-vehicle sensors (not shown). In HEV control device 28, the motor 22 generates a vehicular driving force by electric power supplied from the driving battery 18. Further, the motor 22 controls switching between the first traveling mode in which the engine 10 is stopped and the second traveling mode in which the motor 22 and the engine 10 each generate a vehicle driving force. The first driving mode can also be referred to as EV mode. The second driving mode can also be referred to as HV mode. HEV control device 28 transmits a control instruction related to the engine 10 to the engine control device 30. The engine control device 30 controls the operation of the engine 10 in accordance with the received instruction. As the control of the first traveling mode, the control of the second traveling mode, and the switching control of the first traveling mode and the second traveling mode, various known controls can be adopted.

The engine control device 30 includes a first determination unit 40, a second determination unit 42, an output control unit 44, and an engine control unit 46. The functional configuration of HEV control device 28 and the engine control device 30 can be realized by cooperation of hardware resources and software resources. HEV control device 28 and the engine control device 30 each include CPU (Central Processing Unit), ROM (Read Only Memory), RAM (Random Access Memory), and the like as hardware-resources. ROM stores various control programs as software resources, maps referred to when the various control programs are executed, and the like. CPU executes an arithmetic process based on various control programs and maps stored in ROM. RAM is a memory that temporarily stores an operation performed by CPU, data inputted from the sensors, and the like. HEV control device 28 can be constituted by, for example, an HEV-ECU (Electronic Control Unit). The engine control device 30 can be constituted by, for example, an engine ECU.

HEV control device 28 and the engine control device 30 cooperatively control the engine 10, the alternator 12, and DC/DC converter 24 based on, for example, the output current of DC/DC converter 24 detected by a current sensor (not shown). Then, HEV control device 28 and the engine control device 30 control supplying power to the auxiliary load 16.

For example, HEV control device 28 causes DC/DC converter 24 to transmit the second power generation voltage instruction V2 to DC/DC converter 24, and to thereby cause the electric power to be outputted. If the current consumed by the auxiliary load 16 is relatively small and the output current of DC/DC converter 24 is less than a predetermined set point, HEV control device 28 does not send a power generation instruction to the engine control device 30. As a result, the alternator 12 does not generate electricity, and the power output from DC/DC converter 24 is supplied to the auxiliary load 16. The setting value can be appropriately determined by an experiment or a simulation.

When the current consumed by the auxiliary load 16 becomes relatively large and the output current of DC/DC converter 24 reaches the set value, HEV control device 28 sends a power generation instruction to the engine control device 30. In the engine control device 30, in response to the received power generation instruction, the engine control unit 46 starts the engine 10 if the engine 10 is not operating, sends a first power generation voltage instruction V1 to the alternator 12, and causes the alternator 12 to generate power. As a result, the output power of DC/DC converter 24 and the output power of the alternator 12 are supplied to the auxiliary load 16, and the auxiliary load 16 with relatively large power consumption can be operated.

The auxiliary battery 14 is also capable of supplying power to the auxiliary load 16, but is configured such that the output current of the auxiliary battery 14 is maintained below a predetermined current threshold. The current threshold is, for example, sufficiently smaller than the upper limit of the output current of DC/DC converter 24 and sufficiently smaller than the upper limit of the output current of the alternator 12. The current threshold can be determined as appropriate by experimentation or simulation.

Note that HEV control device 28 and the engine control device 30 may control the power supplied to the auxiliary load 16 by the alternator 12 and DC/DC converter 24 by other known controls.

The engine control device 30 executes an arbitration process based on the output current I1 of the auxiliary battery 14, the first power generation status information S1, and the second power generation status information S2, and determines whether or not to warn DC/DC converter 24 and the alternator 12 and the content of the warning.

The first determination unit 40 determines whether the alternator 12 is normal or abnormal based on the first power generation status information S1 received from the alternator 12, that is, information regarding the operation state of the alternator 12, and supplies the determination result to the output control unit 44. For example, the first determination unit 40 acquires the rotational speed of the engine 10, and determines that the alternator 12 is abnormal when the rotational speed of the rotor of the alternator 12 is lower than the rotational speed of the engine 10. When the internal voltage of the alternator 12 is not included in the predetermined first voltage range including the voltage indicated by the first power generation voltage instruction V1, the first determination unit 40 may determine that the alternator 12 is abnormal. The first voltage range can be determined as appropriate by experiment or simulation. The first determination unit 40 may determine whether the alternator 12 is abnormal based on the output current of the alternator 12. Various known techniques can be employed for determining abnormality of the alternator 12.

The second determination unit 42 determines whether DC/DC converter 24 is normal or abnormal based on the second power generation status information S2 received from HEV control device 28, that is, information regarding the operation state of DC/DC converter 24. Thereafter, the second determination unit 42 supplies the determination result to the output control unit 44. For example, the second determination unit 42 may determine that DC/DC converter 24 is abnormal when the internal voltage of DC/DC converter 24 is not included in the predetermined second voltage range including the voltage indicated by the second power generation voltage instruction V2. The second voltage range can be determined as appropriate by experiment or simulation. The second determination unit 42 may determine whether DC/DC converter 24 is abnormal based on the output current of DC/DC converter 24. Various known techniques can be employed for determining the anomaly of DC/DC converter 24.

The first determination unit 40 may be provided in the alternator 12 instead of being provided in the engine control device 30. In this case, the first determination unit 40 may acquire information on the operating state of the alternator 12 and perform the above-described determination. The alternator 12 may output, as the first power generation status information S1, information indicating whether the alternator 12 determined by the first determination unit 40 is normal or abnormal to the engine control device 30.

The second determination unit 42 may be provided in DC/DC converter 24 instead of being provided in the engine control device 30. The second determination unit 42 may determine the operation status of DC/DC converter 24 and make the above-described determination. DC/DC converter 24 may output, as the second power generation status information S2, information indicating whether DC/DC converter 24 determined by the second determination unit 42 is normal or abnormal to HEV control device 28.

The output control unit 44 compares the output current I1 of the auxiliary battery 14 with the aforementioned current threshold value, and when the output current I1 of the auxiliary battery 14 is equal to or greater than the current threshold value, sends a first output instruction to the output unit 32. When the output current I1 of the auxiliary battery is equal to or greater than the current threshold, it is assumed that the output power of both DC/DC converter 24 and the alternator 12 is not supplied to the auxiliary load 16, and that the consumed current of the auxiliary load 16 is relatively large.

The fact that the output current I1 of the auxiliary battery 14 is equal to or greater than the current threshold value corresponds to the fact that the shortage of the electric power balance in the auxiliary load 16 is equal to or greater than a certain value. The electric power balance in the auxiliary load 16 is obtained by subtracting the electric power consumed by the auxiliary load 16 from the electric power supplied from DC/DC converter 24 and the alternator 12 to the auxiliary load 16.

Note that, instead of the output current I1 of the auxiliary battery 14, the output control unit 44 may compare the voltage of the power supply line L1 detected by a voltage sensor (not shown) with a predetermined voltage threshold. When the voltage of the power supply line L1 is equal to or lower than the voltage threshold value, the first output instruction may be sent to the output unit 32. When the output current I1 of the auxiliary battery 14 is equal to or higher than the current threshold, the voltage threshold is set so that the voltage of the power supply line L1 becomes equal to or lower than the voltage threshold.

In addition, the output control unit 44 may compare SOC (State Of Charge) of the auxiliary battery 14 obtained by a known method with a predetermined SOC threshold value instead of the output current I1 of the auxiliary battery 14. When SOC of the auxiliary battery 14 is equal to or less than SOC threshold, the first output instruction may be sent to the output unit 32. When the output current I1 of the auxiliary battery 14 is equal to or higher than the current threshold, SOC threshold is set so that SOC of the auxiliary battery 14 becomes equal to or lower than SOC threshold.

When the output current I1 of the auxiliary battery 14 is less than the current threshold, if the first determination unit 40 and the second determination unit 42 determine that both DC/DC converter 24 and the alternator 12 are abnormal, the output control unit 44 sends a first output instruction to the output unit 32.

When the output current I1 of the auxiliary battery 14 is less than the current threshold, the output control unit 44 sends a second output instruction to the output unit 32 when the first determination unit 40 and the second determination unit 42 determine that one of DC/DC converter 24 and the alternator 12 is abnormal.

When the output current I1 of the auxiliary battery 14 is less than the current threshold, if the first determination unit 40 and the second determination unit 42 determine that both DC/DC converter 24 and the alternator 12 are normal, the output control unit 44 does not send an output instruction.

When it is determined that DC/DC converter 24 is abnormal and the alternator 12 is normal, the engine control unit 46 causes the engine 10 to continuously generate a driving force, and causes the alternator 12 to generate electric power. The driving force of the engine 10 is also transmitted to the driving wheels. The engine control unit 46 determines the fuel injection amount in the engine 10 from, for example, the amount of depression of an accelerator pedal (not shown) and the vehicle speed. When DC/DC converter 24 is abnormal and the alternator 12 is normal, if the start-up switch is on, the engine control unit 46 continues to generate a driving force to the engine 10 even when the vehicle stops.

Accordingly, the alternator 12 can generate electric power by the driving force of the engine 10, and the generated electric power can be supplied to the auxiliary load 16. Therefore, the auxiliary load 16 required for traveling can be continuously operated. When it is determined that DC/DC converter 24 is abnormal, there is a possibility that the motor 22 cannot generate a driving force due to an abnormality in the power converter 20 or the like of HEV device, but the vehicle can travel by the driving force generated by the engine 10. In addition, the engine control device 30 operates even if HEV device fails, so that the engine 10 can be controlled.

When DC/DC converter 24 is normal and the alternator 12 is abnormal, the engine control unit 46 controls the engine 10 in accordance with an instruction from HEV control device 28. That is, the vehicles can travel while switching between the first travel mode and the second travel mode, as in the case where both DC/DC converter 24 and the alternator 12 are normal. While the alternator 12 is not capable of generating electricity, DC/DC converter 24 can provide power to the auxiliary load 16. Therefore, the auxiliary load 16 required for traveling can be continuously operated.

The output unit 32 includes, for example, an MID (Multi Information Display) that is a display unit provided in the instrument cluster, and provides various types of information to the occupant of the vehicle. Upon receiving an output instruction from the output control unit 44, the output unit 32 displays a warning regarding an anomaly between DC/DC converter 24 and the alternator 12 to the occupant of the vehicle. The display includes, for example, a warning light and a character representing a message. The output unit 32 may output a warning by using a sound.

Upon receiving the first output instruction from the output control unit 44, the output unit 32 outputs a first warning prompting a stop. That is, when the output current I1 of the auxiliary battery 14 is equal to or greater than the current threshold, or when the output current I1 is less than the current threshold and both DC/DC converter 24 and the alternator 12 are determined to be abnormal, the output unit 32 outputs the first alert. The first warning includes, for example, a message prompting a stop. The first warning may include an indication of a warning light indicating that both DC/DC converter 24 and the alternator 12 are abnormal.

According to the first warning, since the abnormality has occurred, it is possible to notify the occupant that the vehicle needs to stop without continuing the traveling. In this case, when the auxiliary battery 14 continues to be discharged and the electric power stored in the auxiliary battery 14 substantially disappears, the auxiliary load 16 stops operating and the vehicle cannot continue traveling.

Further, since the first warning is output even when the output current I1 of the auxiliary battery 14 is equal to or greater than the current threshold value, the first warning can be appropriately output even when a failure that is not determined to be abnormal by the first determination unit 40 and the second determination unit 42 occurs.

Upon receiving the second output instruction from the output control unit 44, the output unit 32 outputs a second warning different from the first warning. That is, when the output current I1 of the auxiliary battery 14 is less than the current threshold and one of DC/DC converter 24 and the alternator 12 is determined to be abnormal, the output unit 32 outputs a second alert. The second warning includes, for example, a message prompting the dealer to inspect or repair the vehicle. The second warning may include an indication of a warning light indicating that either DC/DC converter 24 or the alternator 12 is abnormal.

When one of DC/DC converter 24 and the alternator 12 is abnormal, a second warning, which is different from the first warning prompting the stop, is outputted, so that the occupant can be notified that the abnormality has occurred but the vehicle can continue traveling. The second warning message can also inform the occupant that the vehicle needs to be serviced or repaired. Therefore, the driver can continue the traveling of the vehicle, which is convenient. The driver may drive the vehicle and bring the vehicle to a store or the like.

In this situation, the normal ones of DC/DC converter 24 and the alternator 12 can provide power to the auxiliary load 16, so that the vehicles can continue to travel. However, for example, in a case where the state in which the power consumption of the auxiliary load 16 is relatively large continues for a long time, the auxiliary battery 14 may be discharged and the auxiliary load 16 may not operate.

The output unit 32 does not output a warning when an output instruction is not received from the output control unit 44, that is, when it is determined that the output current I1 of the auxiliary battery 14 is less than the current threshold and both DC/DC converter 24 and the alternator 12 are normal.

Here, a power supply system of a comparative example recognized by the present inventor will be described. In the comparative example, even when either one of DC/DC converter and the alternator is abnormal, the output unit outputs a first warning prompting a stop. Therefore, even when one of DC/DC converter and the alternator is abnormal and the vehicle can continue traveling, the driver stops the vehicle. On the other hand, according to the embodiment, as described above, the driver can continue the traveling of the vehicle.

Figure 2:
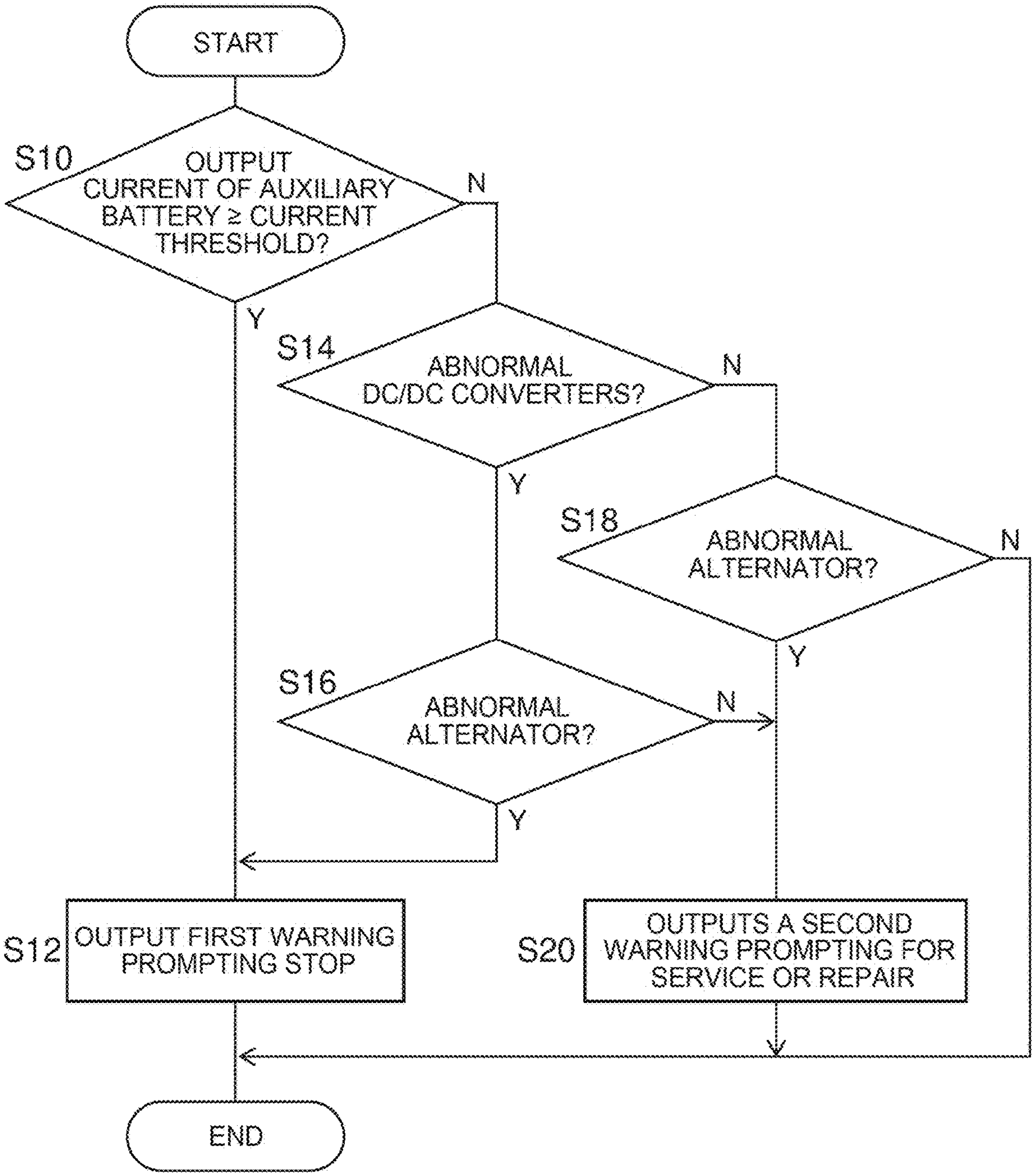
FIG. 2 is a flowchart illustrating a warning output process in the power supply system of FIG. 1.

Next, an overall operation of the power supply system 1 having the above-described configuration will be described. FIG. 2 is a flowchart showing a warning output process in the power supply system 1 of FIG. 1. The process of FIG. 2 is repeatedly executed.

When the output current of the auxiliary battery 14 is equal to or greater than the current threshold value (Y in S10), the output unit 32 outputs a first warning prompting a stop (S12), and the process is ended. If the output current of the auxiliary battery 14 is less than the current threshold (N in S10), if DC/DC converter 24 is abnormal (Y in S14) and the alternator 12 is abnormal (Y in S16), the process proceeds to S12.

If the alternator 12 is not abnormal in S16 (N in S16), the output unit 32 outputs a second alert prompting inspection or repair (S20), and the process is terminated. If S14 indicates that DC/DC converter 24 is not abnormal (N in S14), if the alternator 12 is abnormal (Y in S18), the process proceeds to S20. If the alternator 12 is not abnormal in S18 (N in S18), the process is terminated.

According to the embodiment, in hybrid electric vehicle, the warnings regarding DC/DC converter 24 and the alternator 12 can be appropriately outputted.

The present disclosure has been described with reference to the embodiments. Note that the embodiments are merely an example. It is to be understood by those skilled in the art that various modifications are possible by combining the components and the processing processes and that such modifications are also within the scope of the present disclosure.

What is claimed is:

1. A power supply system mounted on a hybrid electric vehicle, the power supply system comprising:
- a direct-current (DC)/DC converter that converts an output voltage of a driving battery of the hybrid electric vehicle and supplies the converted voltage to an auxiliary load;
- an alternator that is driven by an engine of the hybrid electric vehicle to generate electric power and supplies the generated electric power to the auxiliary load;
- an output unit that outputs a warning about the DC/DC converter and the alternator to an occupant of the hybrid electric vehicle;
- an auxiliary battery that supplies electric power to the auxiliary load;
- a first determination unit that determines whether the DC/DC converter is abnormal based on information about an operation state of the DC/DC converter; and
- a second determination unit that determines whether the alternator is abnormal based on information about an operation state of the alternator, wherein
- the output unit is configured to:
  - output a first warning that prompts stopping the vehicle when a current that flows from the auxiliary battery to the auxiliary load is equal to or greater than a threshold value; and
  - when the current is less than the threshold value,
    - output the first warning in a case where a determination is made that both the DC/DC converter and the alternator are abnormal,
    - output a second warning in a case where a determination is made that one of the DC/DC converter and the alternator is abnormal, the second warning being different from the first warning, and
    - output no warning in a case where a determination is made that both the DC/DC converter and the alternator are normal.

2. The power supply system according to claim 1, wherein the second warning includes a message that prompts inspecting or repairing the hybrid electric vehicle.

3. The power supply system according to claim 1, further comprising an engine control unit that causes the engine to keep generating a drive force and causes the alternator to generate electric power when the DC/DC converter is abnormal and the alternator is normal, wherein the drive force of the engine is also transmitted to drive wheels.

4. The power supply system according to claim 3, wherein the engine control unit causes the engine to keep generating a drive force, even if the hybrid electric vehicle is stopped, when the DC/DC converter is abnormal and the alternator is normal.

* * * * *